(12) United States Patent
Lu et al.

(10) Patent No.: US 8,711,494 B2
(45) Date of Patent: Apr. 29, 2014

(54) IMAGING LENS WITH THREE LENS ELEMENTS, AND ELECTRONIC APPARATUS HAVING THE SAME

(75) Inventors: I-Lung Lu, Taichung (TW); Poche Lee, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 0 days.

(21) Appl. No.: 13/547,834

(22) Filed: Jul. 12, 2012

(65) Prior Publication Data

US 2013/0170050 A1 Jul. 4, 2013

(30) Foreign Application Priority Data

Dec. 29, 2011 (TW) .............................. 100149548 A

(51) Int. Cl.
*G02B 9/12* (2006.01)

(52) U.S. Cl.
CPC ........................................ *G02B 9/12* (2013.01)
USPC ........................................................ 359/784

(58) Field of Classification Search
CPC ........................... G02B 9/00; G02B 9/12–9/64
USPC ................. 359/754–760, 763–769, 771–780, 359/784–789, 791, 792

See application file for complete search history.

(56) References Cited

U.S. PATENT DOCUMENTS

| | | | | |
|---|---|---|---|---|
| 6,987,625 B2* | 1/2006 | Nakamura | ..................... | 359/791 |
| 7,006,305 B2* | 2/2006 | Amanai | ...................... | 359/791 |
| 7,304,807 B2* | 12/2007 | Isono | ............................. | 359/716 |
| 7,420,609 B2* | 9/2008 | Yamaguchi et al. | .......... | 348/335 |
| 7,458,737 B2* | 12/2008 | Isono | ............................. | 396/439 |
| 8,456,760 B2* | 6/2013 | Ko | ................................ | 359/716 |
| 8,493,671 B2* | 7/2013 | Lee | .............................. | 359/791 |
| 2010/0220401 A1* | 9/2010 | Do | ................................ | 359/716 |
| 2012/0154929 A1* | 6/2012 | Tsai et al. | ..................... | 359/714 |

FOREIGN PATENT DOCUMENTS

| | | |
|---|---|---|
| TW | 200831976 A | 8/2008 |
| TW | 200928485 A | 7/2009 |
| TW | 2010259838 A1 | 10/2010 |
| TW | 201128218 A | 8/2011 |
| TW | 201133023 A | 10/2011 |

* cited by examiner

*Primary Examiner* — Darryl J Collins
(74) *Attorney, Agent, or Firm* — Schwabe Williamson & Wyatt

(57) ABSTRACT

An imaging lens includes first, second, and third lens elements arranged from an object side to an image side in the given order. The first lens element has a positive refracting power, and has a convex object-side surface facing toward the object side. The second lens element has a concave object-side surface facing toward the object side, and a convex image-side surface facing toward the image side. The third lens element has an image-side surface facing toward the image side and having a concave portion in a vicinity of an optical axis of the imaging lens. The imaging lens satisfies $|v_1-v_2|<5$, and $|v_1-v_3|>20$, where $v_1$, $v_2$, and $v_3$ represent dispersion coefficients of the first, second, and third lens elements, respectively.

6 Claims, 18 Drawing Sheets

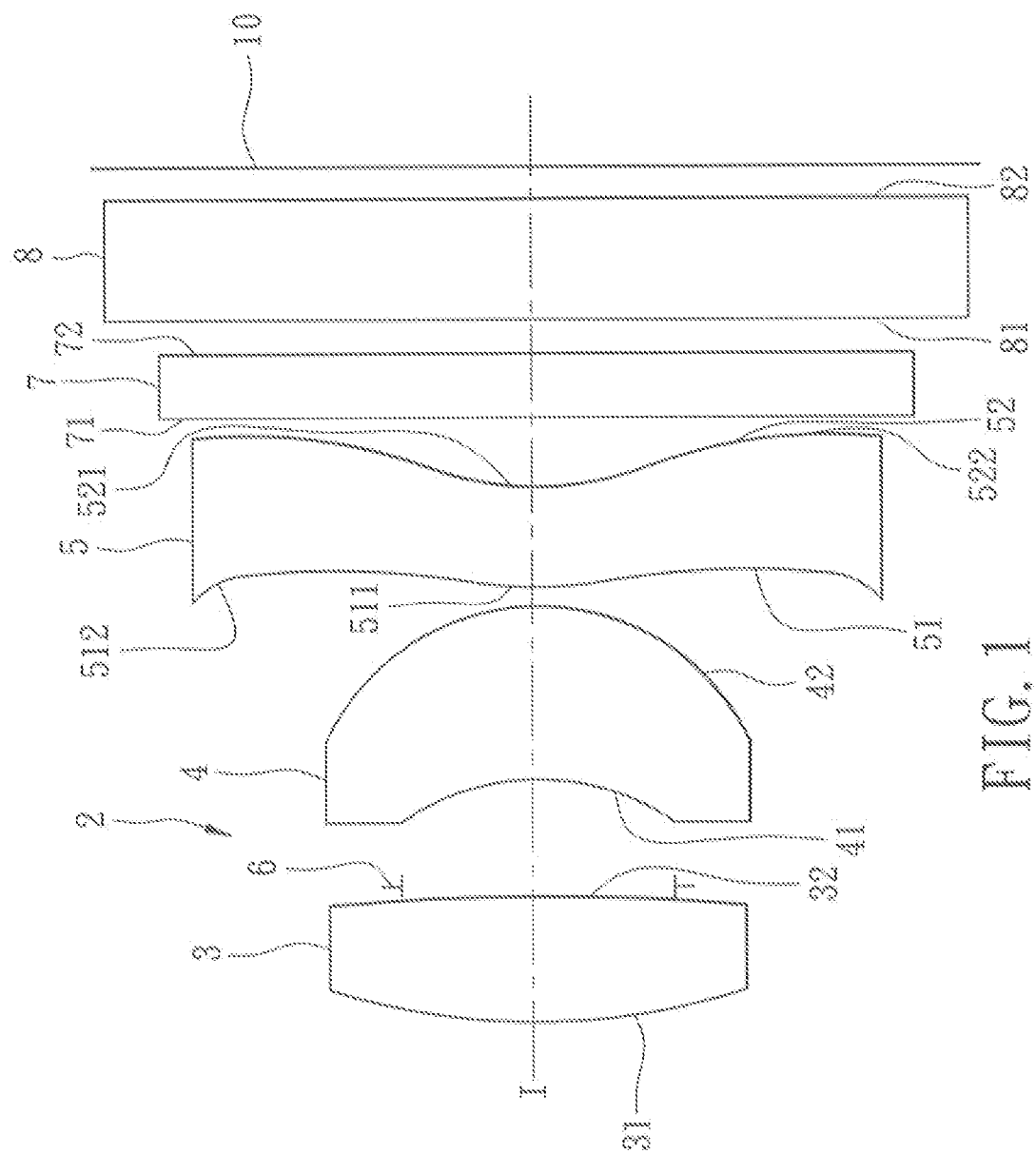

|  | Surface | Radius of curvature (mm) | Thickness (mm) | Refractive index ($N_d$) | Dispersion coefficient ($\nu_d$) |
|---|---|---|---|---|---|
| First lens element 3 | Object-side surface 31 | 1.373 | 0.395 | 1.546 | 56.11 |
|  | Image-side surface 32 | -44.782 | 0.088 |  |  |
| Aperture stop 6 | ... | ∞ | 0.311 | ... | ... |
| Second lens element 4 | Object-side surface 41 | -0.880 | 0.554 | 1.533 | 55.73 |
|  | Image-side surface 42 | -0.627 | 0.060 |  |  |
| Third lens element 5 | Object-side surface 51 | 0.867 | 0.325 | 1.655 | 21.45 |
|  | Image-side surface 52 | 0.592 | 0.223 |  |  |
| Optical filter 7 | Object-side surface 71 | ∞ | 0.210 | 1.518 | 64.17 |
|  | Image-side surface 72 | ∞ | 0.100 |  |  |
| Protection glass 8 | Object-side surface 81 | ∞ | 0.400 | 1.518 | 64.17 |
|  | Image-side surface 82 | ∞ | 0.100 |  |  |

FIG. 2

| | Object-side surface 31 | Image-side surface 32 | Object-side surface 41 | Image-side surface 42 | Object-side surface 51 | Image-side surface 52 |
|---|---|---|---|---|---|---|
| NR | 5.5034E-01 | 6.2511E-01 | 4.5165E-01 | 6.4057E-01 | 1.1624E+00 | 1.2261E+00 |
| K | 0.0000E+00 | 0.0000E+00 | 0.0000E+00 | -1.0000E+00 | -1.0000E+00 | -1.0000E+00 |
| a4 | -4.3132E-03 | -2.3803E-02 | -3.8432E-02 | -7.0703E-01 | -8.3065E+00 | -6.8475E+00 |
| a6 | -1.4696E-02 | -3.1628E-02 | 4.7062E-02 | 3.6064E+00 | 9.9683E+01 | 4.8636E+01 |
| a8 | 4.0283E-02 | -9.0190E-02 | -4.6635E-01 | -1.3457E+01 | -1.0121E+03 | -3.7711E+02 |
| a10 | -8.9443E-02 | 3.7173E-01 | 1.4141E-00 | 2.9374E+01 | 7.4120E+03 | 2.4645E+03 |
| a12 | 9.6631E-02 | -6.7674E-01 | -2.6508E+00 | 1.1850E+01 | -3.8608E+04 | -1.2333E+04 |
| a14 | -5.6718E-02 | 5.7710E-01 | 3.0099E+00 | -4.5972E+02 | 1.4467E+05 | 4.6102E+04 |
| a16 | 1.3636E-02 | -1.3904E-01 | -1.8610E+00 | 2.3005E+03 | -3.9419E+05 | -1.2816E+05 |
| a18 | ... | ... | ... | -6.7522E+03 | 7.8499E+05 | 2.6429E+05 |
| a20 | ... | ... | ... | 1.3114E+04 | -1.1393E+06 | -4.0127E+05 |
| a22 | ... | ... | ... | -1.7273E+04 | 1.1895E+06 | 4.4129E+05 |
| a24 | ... | ... | ... | 1.5274E+04 | -8.6908E+05 | -3.4105E+05 |
| a26 | ... | ... | ... | -8.6873E+03 | 4.2125E+05 | 1.7530E+05 |
| a28 | ... | ... | ... | 2.8717E+03 | -1.2159E+05 | -5.3727E+04 |
| a30 | ... | ... | ... | -4.1918E+02 | 1.5810E+04 | 7.4209E+03 |

FIG. 3

|  | Surface | Radius of curvature (mm) | Thickness (mm) | Refractive index ($N_d$) | Dispersion coefficient ($\nu_d$) |
|---|---|---|---|---|---|
| First lens element 3 | Object-side surface 31 | 1.404 | 0.381 | 1.546 | 56.11 |
|  | Image-side surface 32 | -10.000 | 0.075 |  |  |
| Aperture stop 6 |  | ∞ | 0.342 | ... | ... |
| Second lens element 4 | Object-side surface 41 | -0.848 | 0.529 | 1.546 | 56.11 |
|  | Image-side surface 42 | -0.574 | 0.060 |  |  |
| Third lens element 5 | Object-side surface 51 | 1.026 | 0.325 | 1.655 | 21.45 |
|  | Image-side surface 52 | 0.625 | 0.223 |  |  |
| Optical filter 7 | Object-side surface 71 | ∞ | 0.210 | 1.518 | 64.17 |
|  | Image-side surface 72 | ∞ | 0.100 |  |  |
| Protection glass 8 | Object-side surface 81 | ∞ | 0.400 | 1.518 | 64.17 |
|  | Image-side surface 82 | ∞ | 0.107 |  |  |

FIG. 6

|    | Object-side surface 31 | Image-side surface 32 | Object-side surface 41 | Image-side surface 42 | Object-side surface 51 | Image-side surface 52 |
|----|------------|------------|------------|------------|------------|------------|
| NR | 5.3219E-01 | 6.0461E-01 | 4.4398E-01 | 6.5074E-01 | 1.1619E+00 | 1.2395E+00 |
| K  | 0.0000E+00 | 0.0000E+00 | 0.0000E+00 | -1.0000E+00 | -1.0000E+00 | -1.0000E+00 |
| a4 | -1.2160E-02 | -2.4221E-02 | -1.8642E-02 | -1.5583E-01 | -2.7736E+00 | -4.6220E+00 |
| a6 | 1.8677E-02 | -4.7782E-02 | -2.4162E-02 | 2.9034E-01 | 5.9947E+00 | 1.4160E+01 |
| a8 | -5.769E-02 | 4.9262E-02 | -1.1263E-01 | -2.8531E+00 | -8.2400E+00 | -3.6734E+01 |
| a10 | 7.1688E-02 | -5.3019E-02 | 2.1674E-01 | 2.7656E+01 | 9.0659E+00 | 7.8683E+01 |
| a12 | -5.0926E-02 | -2.9321E-02 | -1.7709E-01 | -1.9303E+02 | -1.2104E+01 | -1.3659E+02 |
| a14 | 1.4055E-02 | 0.6185E-02 | 5.0908E-02 | 9.2613E+02 | 2.5032E+01 | 2.4183E+02 |
| a16 | -1.0322E-01 | 5.2092E-05 | 6.2266E-05 | -3.1137E+03 | -6.7174E+01 | -4.5544E+02 |
| a18 | ... | ... | 1.4515E-05 | 7.4356E+03 | 1.5263E+02 | 8.0263E+02 |
| a20 | ... | ... | ... | -1.2664E+04 | -2.6507E+02 | -1.1555E+03 |
| a22 | ... | ... | ... | 1.5267E+04 | 3.3890E+02 | 1.2636E+03 |
| a24 | ... | ... | ... | -1.2724E+04 | -3.0736E+02 | -9.9903E+02 |
| a26 | ... | ... | ... | 6.9713E+03 | 1.8082E+02 | 5.3039E+02 |
| a28 | ... | ... | ... | -2.2586E+03 | -6.8204E+01 | -1.7445E+02 |
| a30 | ... | ... | ... | 3.2781E+02 | 1.1301E+01 | 2.5880E+01 |

FIG. 7

|  | Surface | Radius of curvature (mm) | Thickness (mm) | Refractive index ($N_d$) | Dispersion coefficient ($\nu_d$) |
|---|---|---|---|---|---|
| First lens element 3 | Object-side surface 31 | 1.505 | 0.391 | 1.538 | 55.70 |
| | Image-side surface 32 | -12.037 | 0.106 | | |
| Aperture stop 6 | ... | ∞ | 0.342 | ... | ... |
| Second lens element 4 | Object-side surface 41 | -0.791 | 0.480 | 1.493 | 57.21 |
| | Image-side surface 42 | -0.550 | 0.060 | | |
| Third lens element 5 | Object-side surface 51 | 0.932 | 0.325 | 1.589 | 30.04 |
| | Image-side surface 52 | 0.600 | 0.223 | | |
| Optical filter 7 | Object-side surface 71 | ∞ | 0.210 | 1.518 | 64.17 |
| | Image-side surface 72 | ∞ | 0.100 | | |
| Protection glass 8 | Object-side surface 81 | ∞ | 0.400 | 1.518 | 64.17 |
| | Image-side surface 82 | ∞ | 0.139 | | |

FIG. 10

|   | Object-side surface 31 | Image-side surface 32 | Object-side surface 41 | Image-side surface 42 | Object-side surface 51 | Image-side surface 52 |
|---|---|---|---|---|---|---|
| NR | 5.4102E-01 | 6.3283E-01 | 4.2896E-01 | 6.2617E-01 | 1.1531E+00 | 1.2346E+00 |
| K | 0.0000E+00 | 0.0000E+00 | 0.0000E+00 | -1.0000E+00 | -1.0000E+00 | -1.0000E+00 |
| a4 | -1.3028E-02 | -2.9435E-02 | -4.5453E-02 | -1.8784E-01 | -2.8562E+00 | -4.5548E+00 |
| a6 | 2.5524E-02 | -3.9530E-02 | 3.3286E-01 | 9.0329E-01 | 7.8681E+00 | 1.3332E+01 |
| a8 | -1.0170E-01 | -1.0203E-01 | -2.1086E+00 | -6.3009E+00 | -2.0163E+01 | -3.0722E+01 |
| a10 | 2.1021E-01 | 8.1499E-01 | 7.5813E+00 | 2.6153E+01 | 5.4348E+01 | 4.9028E+01 |
| a12 | -2.8086E-01 | -2.0881E+00 | -1.6461E+01 | -6.7621E+01 | -1.3048E+02 | -4.7512E+01 |
| a14 | 2.2465E-01 | 2.4592E+00 | 2.2805E+01 | 1.0835E+02 | 2.5967E+02 | 1.9536E+01 |
| a16 | -9.9318E-02 | -1.3178E+00 | -1.9537E+01 | -1.0473E+02 | -4.6309E+02 | 7.5276E+00 |
| a18 | 1.8621E-02 | 2.8733E+00 | 9.4231E+00 | 5.5864E+01 | 7.5616E+02 | -1.1582E+01 |
| a20 | ... | ... | -1.9553E+00 | -1.2605E+01 | -1.0331E+03 | 3.7854E+00 |
| a22 | ... | ... | ... | ... | 1.0630E+03 | 1.2346E+00 |
| a24 | ... | ... | ... | ... | -7.6924E+02 | ... |
| a26 | ... | ... | ... | ... | 3.6835E+02 | ... |
| a28 | ... | ... | ... | ... | -1.0498E+02 | ... |
| a30 | ... | ... | ... | ... | 1.3477E+01 | ... |

FIG. 11

| | Surface | Radius of curvature (mm) | Thickness (mm) | Refractive index ($N_d$) | Dispersion coefficient ($\nu_d$) |
|---|---|---|---|---|---|
| First lens element 3 | Object-side surface 31 | 1.197 | 0.424 | 1.546 | 56.11 |
| | Image-side surface 32 | 7.005 | 0.097 | | |
| Aperture stop 6 | ... | ∞ | 0.247 | ... | ... |
| Second lens element 4 | Object-side surface 41 | -0.965 | 0.635 | 1.583 | 55.73 |
| | Image-side surface 42 | -0.614 | 0.060 | | |
| Third lens element 5 | Object-side surface 51 | 0.930 | 0.325 | 1.655 | 21.45 |
| | Image-side surface 52 | 0.598 | 0.223 | | |
| Optical filter 7 | Object-side surface 71 | ∞ | 0.210 | 1.518 | 64.17 |
| | Image-side surface 72 | ∞ | 0.100 | | |
| Protection glass 8 | Object-side surface 81 | ∞ | 0.400 | 1.518 | 64.17 |
| | Image-side surface 82 | ∞ | 0.103 | | |

FIG. 14

| | Object-side surface 31 | Image-side surface 32 | Object-side surface 41 | Image-side surface 42 | Object-side surface 51 | Image-side surface 52 |
|---|---|---|---|---|---|---|
| NR | 5.4779E-01 | 6.4130E-01 | 4.1880E-01 | 6.4351E-01 | 1.1382E+00 | 1.1627E+00 |
| K | 0.0000E+00 | 0.0000E+00 | 0.0000E+00 | -1.0000E+00 | -1.0000E+00 | -1.0000E+00 |
| a4 | 8.0508E-03 | -8.9794E-03 | -2.6633E-02 | -7.9830E-01 | -9.2126E+00 | -6.1304E+00 |
| a6 | -2.8807E-02 | -1.4371E-02 | -6.5597E-02 | 2.6612E+00 | 1.1974E+02 | 3.8011E+01 |
| a8 | 8.3669E-02 | -3.2724E-01 | 1.7976E-01 | 3.2362E+01 | -1.2478E+03 | -1.8798E+02 |
| a10 | -1.4263E-01 | 9.7658E-01 | -4.4150E-01 | -6.6508E+02 | 9.3255E+03 | 4.2732E+02 |
| a12 | 1.2844E-01 | -1.4267E+00 | 4.0242E-01 | 4.9769E+03 | -4.9788E+04 | 1.5296E+03 |
| a14 | -6.6300E-02 | 1.0474E+00 | 1.5124E-01 | -2.5620E+04 | 1.9214E+05 | -1.7392E+04 |
| a16 | 1.4409E-02 | -2.5769E-01 | -5.2821E-01 | 8.9688E+04 | -5.4133E+05 | 7.5192E+04 |
| a18 | ... | ... | 2.5045E-01 | -2.2052E+05 | 1.1179E+06 | -2.0017E+05 |
| a20 | ... | ... | ... | 3.8497E+05 | -1.6861E+06 | 3.5939E+05 |
| a22 | ... | ... | ... | -4.7476E+05 | 1.8328E+06 | -4.4470E+05 |
| a24 | ... | ... | ... | 4.0430E+05 | -1.3956E+06 | 3.7488E+05 |
| a26 | ... | ... | ... | -2.2617E+05 | 7.0542E+05 | -2.0589E+05 |
| a28 | ... | ... | ... | 7.4774E+04 | -2.1237E+05 | 6.6465E+04 |
| a30 | ... | ... | ... | -1.1070E+04 | 2.8790E+04 | -9.5673E+03 |

FIG. 15

|  | First preferred embodiment | Second preferred embodiment | Third preferred embodiment | Fourth preferred embodiment |
|---|---|---|---|---|
| $\|\nu 1-\nu 2\|$ | 0.382 | 0.000 | 1.510 | 1.382 |
| $\|\nu 1-\nu 3\|$ | 34.665 | 34.665 | 25.661 | 34.665 |
| $L_{BF}(mm)$ | 1.033 | 1.041 | 1.072 | 1.036 |
| $T_{L1A1-L3A2}/L_{BF}$ | 1.893 | 1.645 | 1.589 | 1.940 |
| $S_{12}(mm)$ | 0.399 | 0.417 | 0.448 | 0.344 |

FIG. 17

IMAGING LENS WITH THREE LENS ELEMENTS, AND ELECTRONIC APPARATUS HAVING THE SAME

CROSS-REFERENCE TO RELATED APPLICATION

This application claims priority of Taiwanese Application No. 100149548, filed on Dec. 29, 2011.

BACKGROUND OF THE INVENTION

1. Field of the Invention

The present invention relates to an imaging lens and an electronic apparatus having the same, more particularly to an imaging lens with three lens elements and an electronic apparatus having the same.

2. Description of the Related Art

In recent years, as use of portable electronic devices (e.g., mobile phones and digital cameras) becomes ubiquitous, much effort has been put into reducing dimensions of portable electronic devices. As dimensions of charged coupled device (CCD) and complementary metal-oxide semiconductor (CMOS) based optical sensors are reduced, dimensions of imaging lens for use with the optical sensors must be correspondingly reduced without significantly compromising optical performance.

In view of the above, each of Taiwanese Patent Publication Nos. 200928485 and 200831976 discloses a conventional imaging lens structure with three lens elements having an overall length, from an object surface of a first lens element to an image plane, of 4 mm or more. Each of Taiwanese Patent Publication Nos. 201133023 and 201131197 discloses a conventional imaging lens structure with three lens elements having an overall length of 3.5 mm or more. Taiwanese Patent Publication No. 201128218 discloses a conventional imaging lens structure with three lens elements having an overall length of 3 mm or more.

It can be understood from the above-exemplified conventional imaging lens structures that the recent trend in development of imaging systems for portable electronic devices focuses on reducing overall lengths of the imaging lens structures. However, as the overall length is reduced, refracting angles of lens elements of the imaging system must be increased so as to enable light traversing through the lens elements to be focused onto an image plane of the imaging system. In normal use, since light has different wavelengths, which correspond to different refracting angles when traversing through the same lens element, an image formed using the abovementioned imaging systems may suffer from chromatic aberration.

SUMMARY OF THE INVENTION

Therefore, an object of the present invention is to provide an imaging lens capable of alleviating the aforesaid drawbacks of the prior art.

Accordingly, an imaging lens of the present invention includes first, second, and third lens elements arranged from an object side to an image side in the given order.

The first lens element has a positive refracting power, and has a convex object-side surface fading toward the object side.

The second lens element has a concave object-side surface facing toward the object side, and a convex image-side surface facing toward the image side.

The third lens element has an image-side surface facing toward the image side and having a concave portion in a vicinity of an optical axis of the imaging lens.

The imaging lens satisfies $|v_1-v_2|<5$, and $|v_1-v_3|>20$, where $v_1$, $v_2$, and $v_3$ represent dispersion coefficients of the first, second, and third lens elements, respectively.

BRIEF DESCRIPTION OF THE DRAWINGS

Other features and advantages of the present invention will become apparent in the following detailed description of the preferred embodiments with reference to the accompanying drawings, of which:

FIG. 1 is a schematic diagram that illustrates the first preferred embodiment of an imaging lens according to the present invention;

FIG. 2 shows values of optical parameters of the imaging lens of the first preferred embodiment;

FIG. 3 shows values of some parameters of an optical equation corresponding to the imaging lens of the first preferred embodiment;

FIG. 6 shows values of optical parameters of the imaging lens of the second preferred embodiment;

FIG. 7 shows values of some parameters of an optical equation corresponding to the imaging lens of the second preferred embodiment;

FIG. 10 shows values of optical parameters of the imaging lens of the third preferred embodiment;

FIG. 11 shows values of some parameters of an optical equation corresponding to the imaging lens of the third preferred embodiment;

FIG. 14 shows values of optical parameters of the imaging lens of the fourth preferred embodiment;

FIG. 15 shows values of some parameters of an optical equation corresponding to the imaging lens of the fourth preferred embodiment;

FIG. 17 is a table that shows values of parameters of the imaging lenses of the first, second, third, and fourth preferred embodiments.

DETAILED DESCRIPTION OF THE PREFERRED EMBODIMENTS

Figure 4:
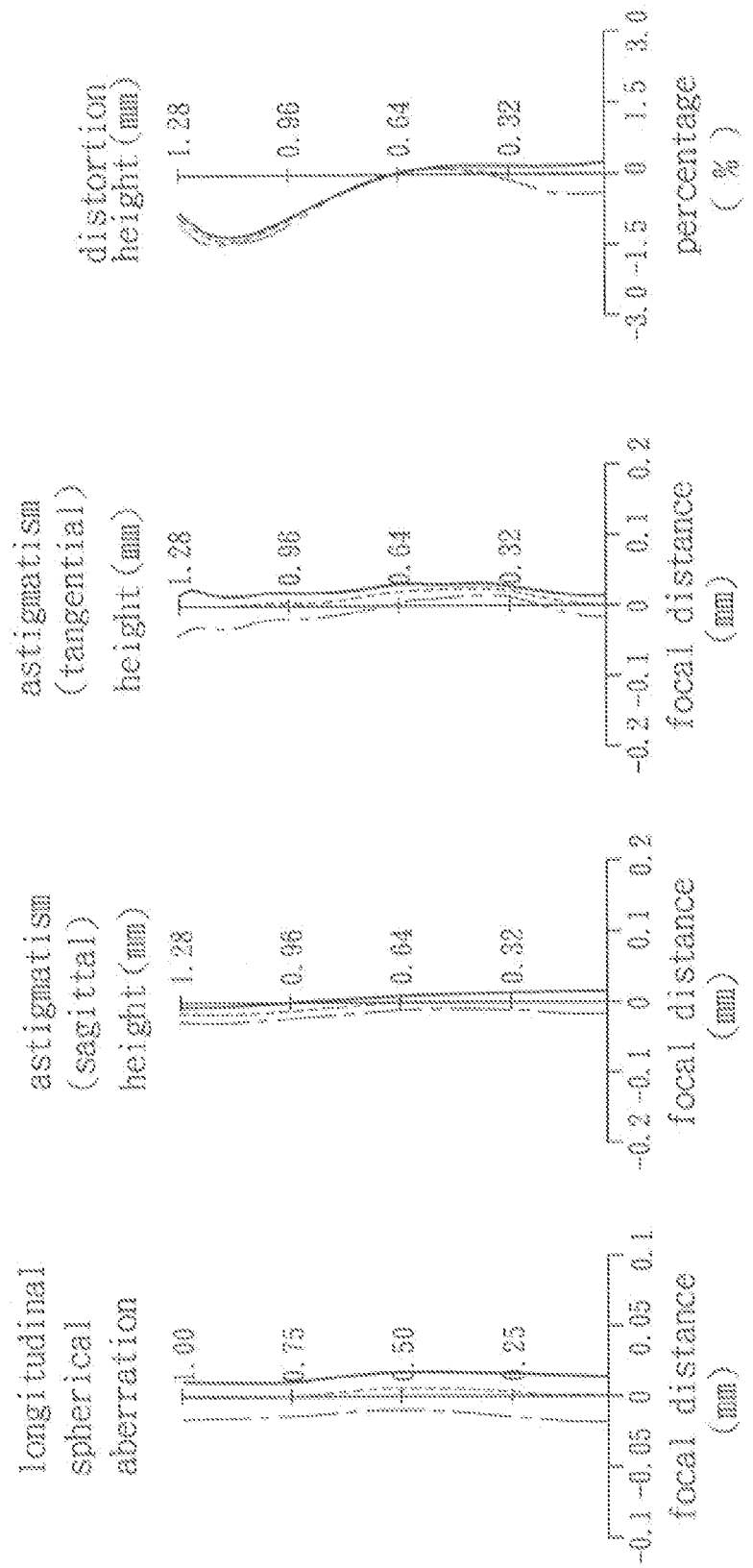
FIGS. 4(a) to 4(d) show different optical characteristics of the imaging lens of the first preferred embodiment.

Before the present invention is described in greater detail, it should be noted that like elements are denoted by the same reference numerals throughout the disclosure.

Referring to FIG. 1, the first preferred embodiment of an imaging lens 2 according to the present invention includes a first lens element 3, an aperture stop 6, a second lens element 4, a third lens element 5, an optical filter 7, and a protection glass 8 arranged in the given order from an object side to an image side. When light enters into the imaging lens 2, it traverses through the first lens element 3, the aperture stop 6, the second lens element 4, the third lens element 5, the optical filter 7, and the protection glass 8 in the given order to form an image at an image plane 10. The optical filter 7 is an infrared cut filter for filtering infrared light to prevent color aberration of images formed at the image plane 10. On the other hand, the protection glass 8 serves to protect an image sensor to be disposed at the image plane 10 from scratch damages.

Each of the first lens element 3, the second lens element 4, the third lens element 5, the optical filter 7, and the protection glass 8 has an object-side surface 31, 41, 51, 71, 81 facing toward the object side, and an image-side surface 32, 42, 52, 72, 82 facing toward the image side. Light that enters the imaging lens 2 travels through the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 71, 72 of the optical filter 7, and the object-side and image-side surfaces 81, 82 of the protection glass 8, in the given order, to form an image on the image plane 10.

In this embodiment, the first lens element 3 has a positive refracting power, and the object-side surface 31 and the image-side surface 32 thereof are convex surfaces and are aspherical.

In this embodiment, the second lens element 4 has a positive refracting power, and the object-side surface 41 and the image-side surface 42 thereof are concave and convex surfaces, respectively, and are aspherical.

In this embodiment, the third lens element 5 has a negative refracting power, the object-side surface 51 thereof has a convex portion 511 in a vicinity of an optical axis of the imaging lens 2, and a concave portion 512 in a vicinity of a periphery of the third lens element 5, and the image-side surface 52 thereof has a concave portion 521 in a vicinity of the optical axis and a convex portion 522 in a vicinity of the periphery of the third lens element 5.

In this embodiment, the aperture stop 6 is interposed between the first and second lens elements 3, 4. The optical filter 7 is interposed between the third lens element 5 and the image plane 10. The protection glass 8 is interposed between the optical filter 7 and the image plane 10. In this embodiment, each of the optical filter 7 and the protection glass 8 is a piece of flat glass.

Each of the object-side surfaces 31, 41, 51, 71, 81 and the image-side surfaces 32, 42, 52, 72, 82 has a center point that coincides with the optical axis (I).

Relationships among some optical parameters of the first preferred embodiment are as follows:

$$|v_1 - v_2| = 0.382 \quad (1)$$

$$|v_1 - v_3| = 34.665 \quad (2)$$

$$\frac{T_{L1A1-L3A2}}{L_{BF}} = 1.893 \quad (3)$$

where: $v_1$, $v_2$, and $v_3$ represent dispersion coefficients of the first, second, and third lens elements 3-5, respectively; $L_{BF}$ represents a shortest distance between the center point of the image-side surface 52 and the image plane 10 along the optical axis (I), and is equal to 1.033 mm in this embodiment; and $T_{L1A2-L3A2}$ represents a distance between the center point of the object-side surface 31 and the center point of the image-side surface 52. Furthermore, a distance between the center point of the image-side surface 32 and the center point of the object-side surface 41 is equal to 0.399 mm in this embodiment.

Shown in FIG. 2 is a table that shows values of optical parameters of the lens elements 3-5, the aperture stop 6, the optical filter 7, and the protection glass 8 of the first preferred embodiment. In this embodiment, the imaging lens 2 has a focal length of 1.67 mm, a half field-of-view of 37.61°, and a system length of 2.77 mm. Each of the object-side surfaces 31, 41, 51 and the image-side surfaces 32, 42, 52 satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_i \times \left(\frac{Y}{NR}\right)^i \quad (4)$$

where "R" represents the radius of curvature of the surface, "Y" represents a distance between projections of an arbitrary point and the center point of the surface on an imaginary plane perpendicular to the optical axis (I), "Z" represents a distance between projections of the arbitrary point and the center point of the surface at the optical axis (I), "K" represents a conic constant of the surface, "$a_i$" represents an $i^{th}$-order coefficient of the surface, and "NR" represents a normalization radius of the surface.

Shown in FIG. 3 is a table that shows values of some parameters of optical equation 4 corresponding to each of the object-side surfaces 31, 41, 51 and the image-side surfaces 32, 42, 52 of the first preferred embodiment.

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

It can be understood from FIG. 4(a) that, since each of the curves corresponding to longitudinal spherical aberration has a focal distance at each field of view (indicated by the vertical axis) that falls within the range of ±0.02 mm, the first preferred embodiment has a relatively low spherical aberration at each of the wavelengths. Furthermore, since a difference in focal distance among the curves at each field of view does not exceed 0.05 mm, the first preferred embodiment has a relatively low chromatic aberration.

It can be understood from FIGS. 4(b) and 4(c) that, since each of the curves corresponding to sagittal astigmatism aberration falls within the range of ±0.05 mm of focal distance, and each of the curves corresponding to tangential astigmatism aberration falls within the range of ±0.03 m of focal distance, the first preferred embodiment has a relatively low optical aberration.

Moreover, as shown in FIG. 4(d), since each of the curves corresponding to distortion aberration falls within a range of ±2%, the first preferred embodiment satisfies requirements in imaging quality of most optical systems.

In view of the above, with the system length reduced down to below 3 mm, the imaging lens 2 of the first preferred embodiment is still able to achieve relatively good optical performance.

Figure 5:
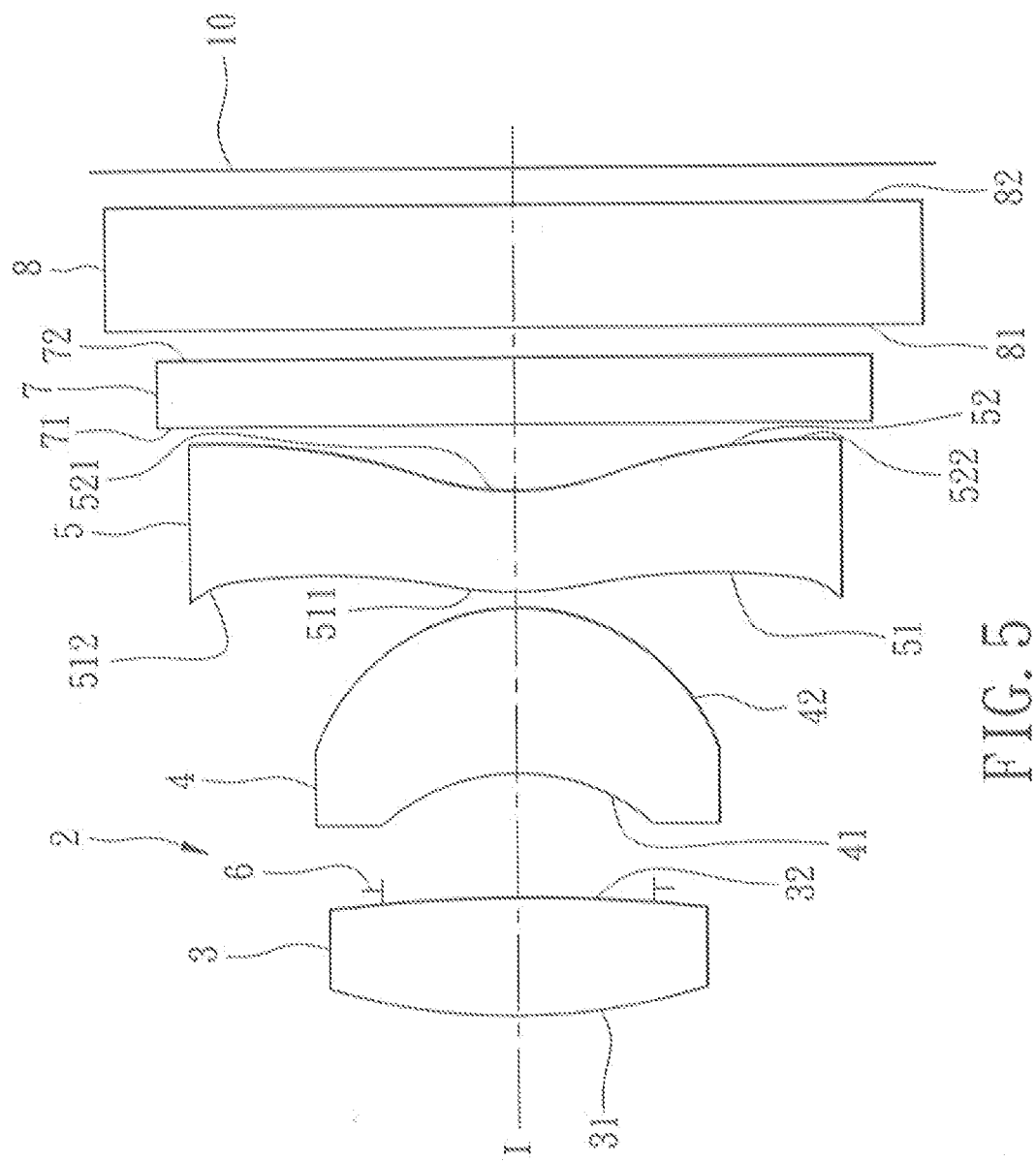
FIG. 5 is a schematic diagram that illustrates the second preferred embodiment of an imaging lens according to the present invention.

Referring to FIG. 5, the main difference between the first and second preferred embodiments resides in the dispersion coefficient of the second lens element 4.

Relationships among some of the optical parameters of the second preferred embodiment are as follows:

$$|v_1 - v_2| = 0 \tag{5}$$

$$|v_1 - v_3| = 34.665 \tag{6}$$

$$\frac{T_{L1A1-L3A2}}{L_{BF}} = 1.645 \tag{7}$$

where $L_{BF}$ is equal to 1.041 mm. Further, the distance between the center point of the image-side surface 32 and the center point of the object-side surface 41 is equal to 0.417 mm in this embodiment.

Shown in FIG. 6 is a table that shows values of the optical parameters of the lens elements 3-5, the aperture stop 6, the optical filter 7, and the protection glass 8 of the second preferred embodiment. In this embodiment, the imaging lens 2 has a focal length of 1.68 mm, a half field-of-view of 39.67°, and a system length of 2.75 mm.

Shown in FIG. 7 is a table that shows values of some parameters of optical equation 4 corresponding to each of the object-side surfaces 31, 41, 51 and the image-side surfaces 32, 42, 52 of the second preferred embodiment.

FIGS. 8(a) to 8(d) show simulation results corresponding to longitudinal spherical aberration, sagittal astigmatism aberration, tangential astigmatism aberration, and distortion aberration of the second preferred embodiment. In each of the simulation results, curves corresponding respectively to wavelengths of 470 nm, 555 nm, and 650 nm are shown.

Figure 8:
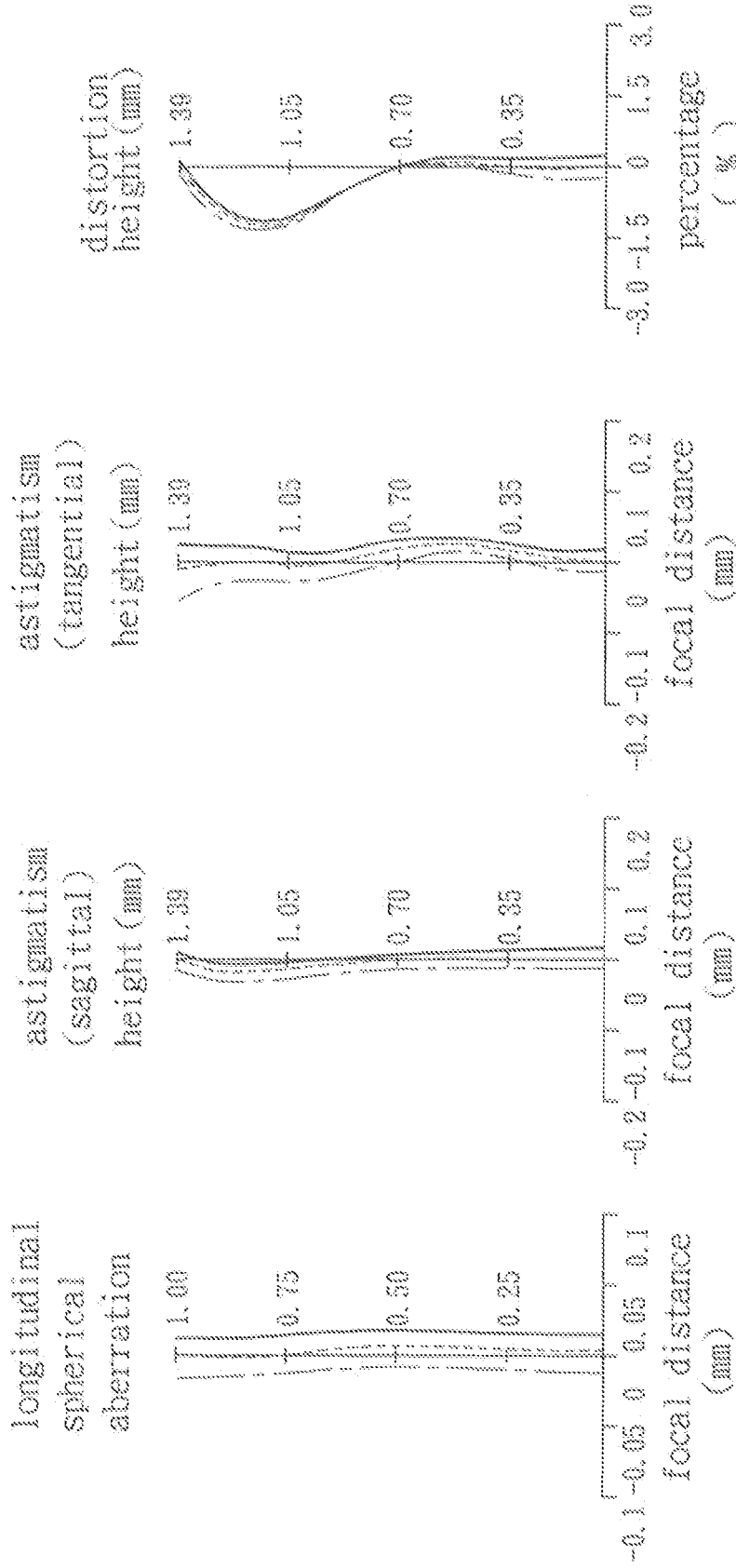
FIGS. 8(a) to 8(d) show different optical characteristics of the imaging lens of the second preferred embodiment.

It can be understood from FIG. 8(a) that the second preferred embodiment has a relatively low spherical aberration at each of the wavelengths, and a relatively low chromatic aberration.

It can be understood from FIGS. 8(b) and 8(c) that, since each of the curves corresponding to sagittal astigmatism aberration falls within the range of ±0.03 mm of focal length, and each of the curves corresponding to tangential astigmatism aberration falls within the range of ±0.05 mm from the optical axis (I), the second preferred embodiment has a relatively low optical aberration.

Moreover, as shown in FIG. 8(d), since each of the curves corresponding to distortion aberration falls within a range of ±2%, the second preferred embodiment satisfies requirements in imaging quality of most optical systems.

In view of the above, with the system length reduced down to below 3 mm, the imaging lens 2 of the second preferred embodiment is still able to achieve relatively good optical performance.

Figure 9:
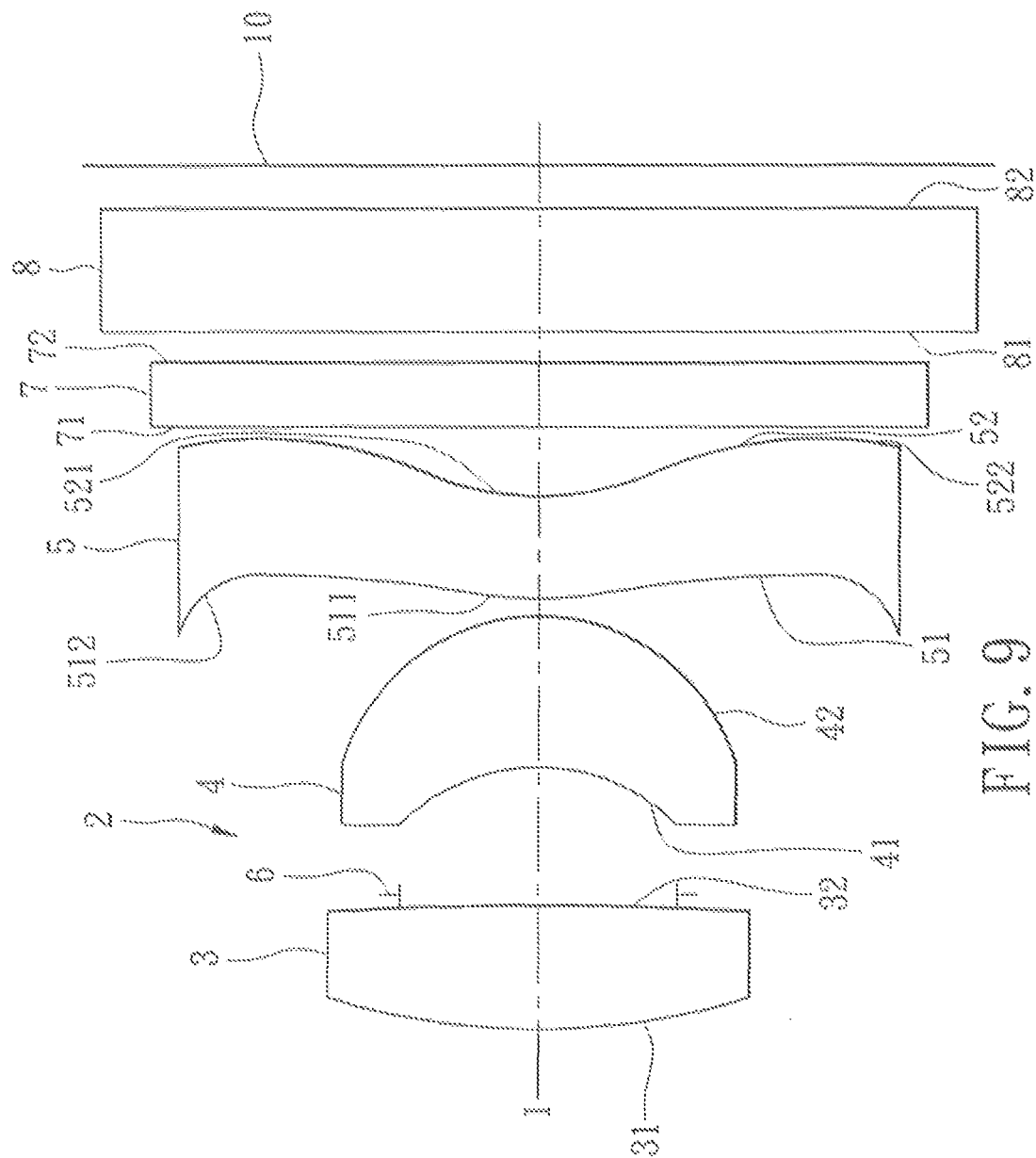
FIG. 9 is a schematic diagram that illustrates the third preferred embodiment of an imaging lens according to the present invention.
Figure 12:
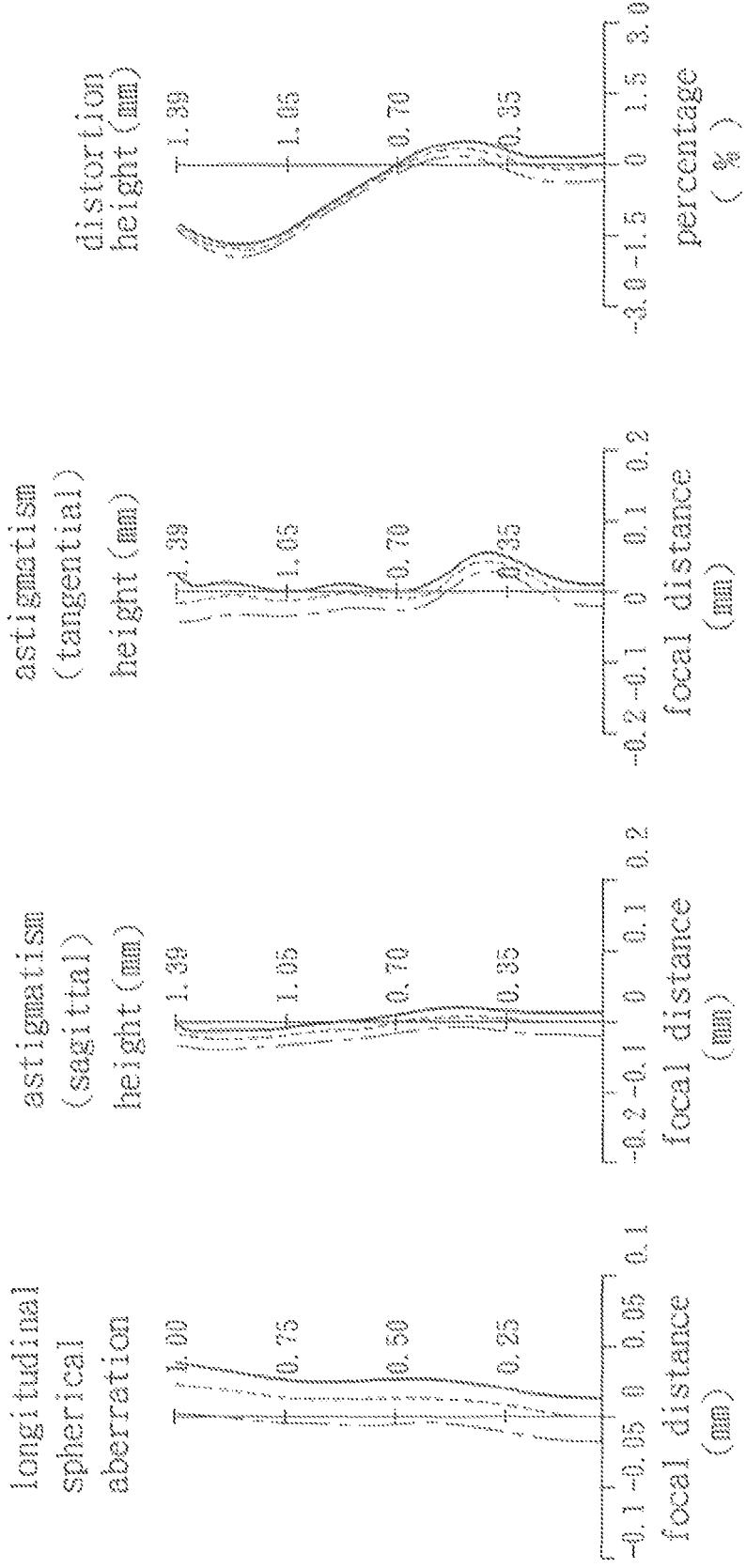
FIGS. 12(a) to 12(d) show different optical characteristics of the imaging lens of the third preferred embodiment.

Referring to FIG. 9, the main difference between the first and third preferred embodiments resides in the dispersion coefficients of the second and third lens elements 4, 5.

Relationships among some of the optical parameters of the third preferred embodiment are as follows:

$$|v_1 - v_2| = 1.510 \tag{8}$$

$$|v_1 - v_3| = 25.661 \tag{9}$$

$$\frac{T_{L1A1-L3A2}}{L_{BF}} = 1.589 \tag{10}$$

where $L_{BF}$ is equal to 1.072 mm. Further, the distance between the center point of the image-side surface 32 and the center point of the object-side surface 41 is equal to 0.448 mm in this embodiment.

Shown in FIG. 10 is a table that shows values of the optical parameters of the lens elements 3-5, the aperture stop 6, the optical filter 7, and the protection glass 8 of the third preferred embodiment. In this embodiment, the imaging lens 2 has a focal length of 1.73 mm, a half field-of-view of 39.16°, and a system length of 2.78 mm.

Shown in FIG. 11 is a table that shows values of some parameters of optical equation 4 corresponding to each of the object-side surfaces 31, 41, 51 and the image-side surfaces 32, 42, 52 of the third preferred embodiment.

Shown in FIGS. 12(a) to 12(d) are longitudinal spherical aberration, sagittal astigmatism aberration, tangential astigmatism aberration, and distortion aberration for the third preferred embodiment. In each one, curves corresponding respectively to wavelengths of 470 nm, 555 nm, and 650 nm are shown. With the system length reduced down to below 3 mm, the imaging lens 2 of the third preferred embodiment is still able to achieve relatively good optical performance.

Figure 13:
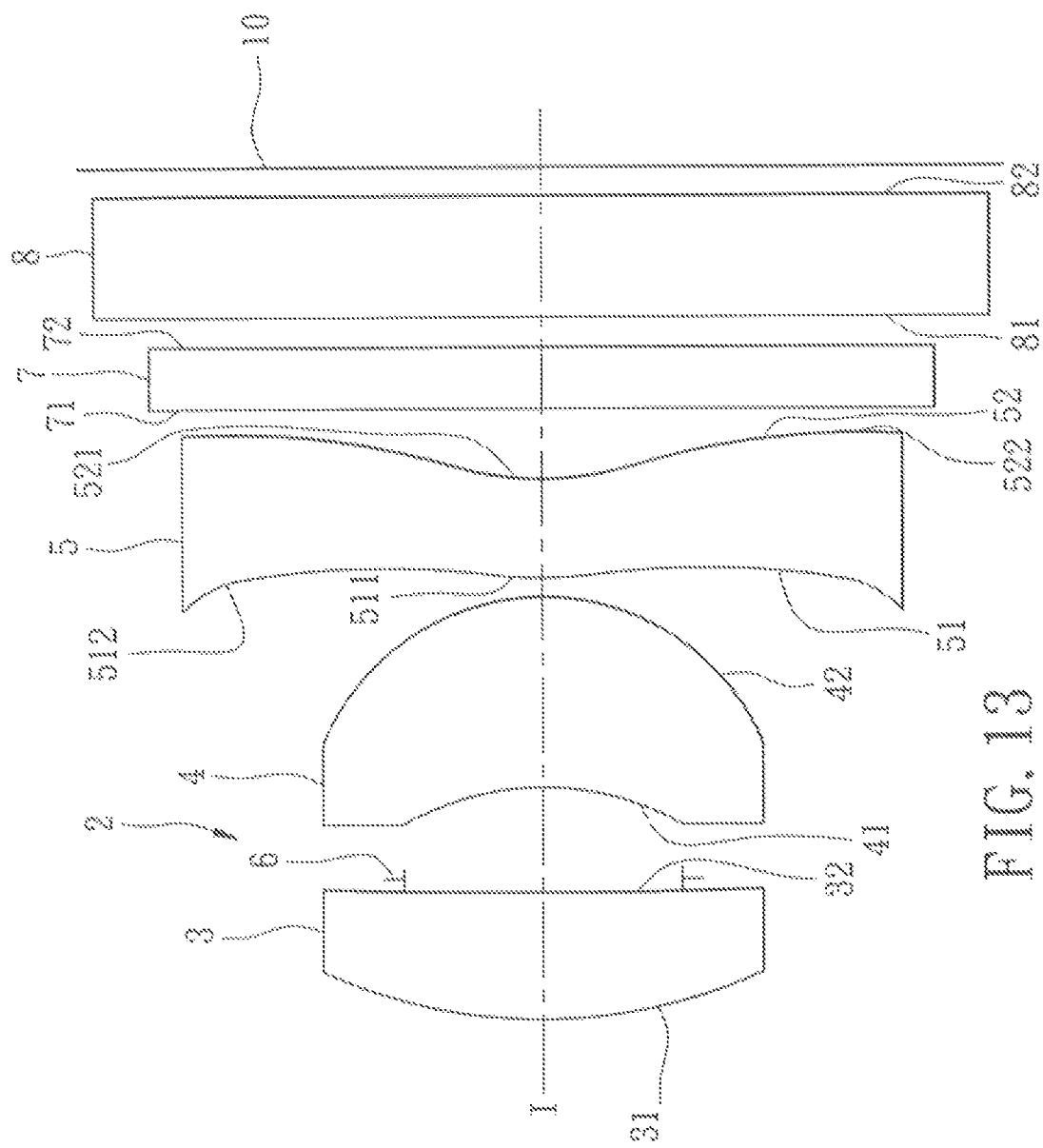
FIG. 13 is a schematic diagram that illustrates the fourth preferred embodiment of an imaging lens according to the present invention.
Figure 16:
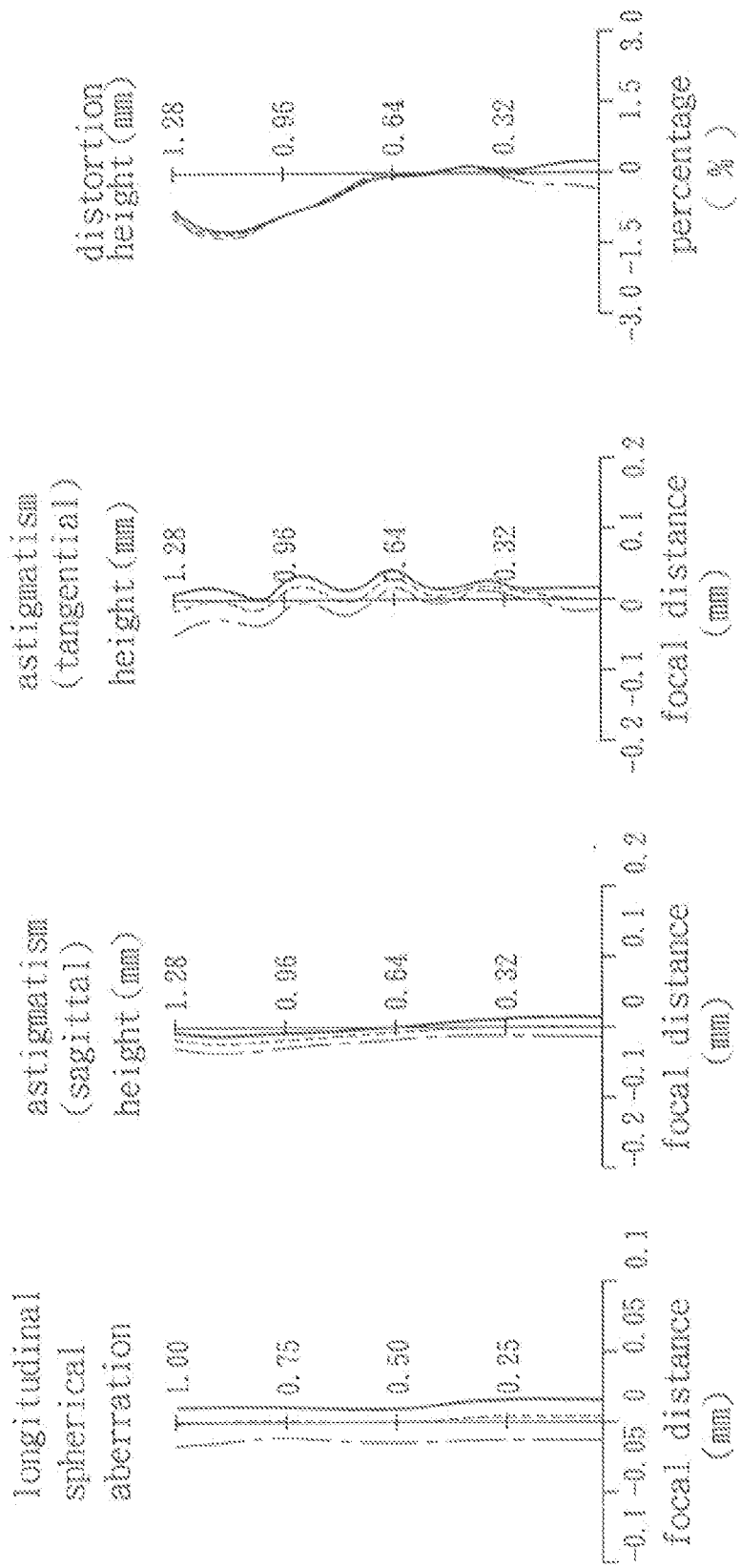
FIGS. 16(a) to 16(d) show different optical characteristics of the imaging lens of the fourth preferred embodiment.

Referring to FIG. 13, the main difference between the first and fourth preferred embodiments resides in the image-side surface 32 of the first lens element 3, which is a concave surface in the fourth preferred embodiment.

Relationships among some of the optical parameters of the third preferred embodiment are as follows:

$$|v_1 - v_2| = 0.382 \tag{11}$$

$$|v_1 - v_3| = 34.665 \tag{12}$$

$$\frac{T_{L1A1-L3A2}}{L_{BF}} = 1.940 \tag{13}$$

where $L_{BF}$ is equal to 1.036 mm. Further, the distance between the center point of the image-side surface 32 and the center point of the object-side surface 41 is equal to 0.344 mm in this embodiment.

Shown in FIG. 14 is a table that shows values of the optical parameters of the lens elements 3-5, the aperture stop 6, the optical filter 7, and the protection glass 8 of the fourth preferred embodiment. In this embodiment, the imaging lens 2 has a focal length of 1.68 mm, a half field-of-view of 37.59°, and a system length of 2.82 mm.

Shown in FIG. 15 is a table that shows values of some parameters of optical equation 4 corresponding to each of the object-side surfaces 31, 41, 51 and the image-side surfaces 32, 42, 52 of the fourth preferred embodiment.

Shown in FIGS. 16(a) to 16(d) are longitudinal spherical aberration, sagittal astigmatism aberration, tangential astigmatism aberration, and distortion aberration for the fourth preferred embodiment. In each one, curves corresponding respectively to wavelengths of 470 nm, 555 nm, and 650 nm are shown. With the system length reduced down to below 3 mm, the imaging lens 2 of the fourth preferred embodiment is still able to achieve relatively good optical performance.

Shown in FIG. 17 is a table that shows the values of the optical parameters related to optical equations 1-3, 5-7, 8-10, and 11-13 for comparison, where $S_{12}$ represents the distance between the center point of the image-side surface 32 and the center point of the object-side surface 41.

Effects of the various optical parameters on the imaging quality are described hereinafter.

When the first and second lens elements 3, 4 satisfy optical equation 14, a difference in extent of dispersion between the first and second lens elements 3, 4 is relatively small, such that the positive refracting power of each of the first lens element 3 and second lens element 4 may be effectively distributed.

$$|v_1 - v_2| < 5 \tag{14}$$

When the first and third lens elements 3, 5 satisfy optical equation 15, a difference in extent of dispersion between the first and third lens elements 3, 5 is relatively large, such that a sum of a ratio of refracting power and dispersion coefficient corresponding to the first lens element 3, that corresponding to the second lens element 4, and that corresponding to the third lens element 5 is relatively small.

$$|v_1 - v_3| > 20 \tag{15}$$

Since each of the preferred embodiments satisfies optical equations 14 and 15, the imaging lens 2 thereof is capable of significantly eliminating chromatic aberration.

More preferably, the imaging lens 2 of the present invention satisfies optical equation 16

$$|v_1 - v_2| < 3 \tag{16}$$

Further, when the first and second lens elements 3, 4 satisfy optical equation 17, the distance between the center point of the image-side surface 32 and the center point of the object-side surface 41 (i.e., $S_{12}$) falls within an adequate range, which enables light that exits from the first lens element 3 via the image-side surface 32 to enter the second lens element 4 via the object-side surface 41 at an adequate height.

$$0.30 \text{ mm} < S_{12} < 0.65 \text{ mm} \tag{17}$$

When the distance between the center point of the image-side surface 32 and the center point of the object-side surface 41 is greater than 0.65 mm, the distance between the first and second lens elements 3, 4 is too large, which is detrimental to reduction of the system length. On the other hand, when the distance between the center point of the image-side surface 32 and the center point of the object-side surface 41 is less than 0.30 mm, light that exits from the first lens element 3 via the image-side surface 32 may not be able to enter the second lens element 4 via the object-side surface 41 at an adequate height, which not only has an adverse effect on the distribution of the refracting powers, but also results in loss of balance in aberration control, leading to deterioration of the imaging quality.

Preferably, to achieve a better imaging quality, the imaging lens 2 of each of the preferred embodiments is designed such that the distance between the center point of the image-side surface 32 and the center point of the object-side surface 41 falls within the range from 0.3 mm to 0.5 mm.

When the imaging lens 2 satisfies optical equation 18, the distance between the center point of the image-side surface and the image plane 10 on the optical axis I (i.e., $L_{BF}$) is sufficiently short, which effectively reduces the overall system length.

$$L_{BF} < 1.3 \text{ mm} \tag{18}$$

When the imaging lens 2 satisfies optical equation 19, a ratio of the distance between the center points of the object-side surface 31 and the image-side surface 52 (i.e., $T_{L1A1-L3A2}$) and the distance between the center point of the image-side surface 52 and the image plane 10 on the optical axis I falls within an adequate range with respect to thicknesses of the first, second, and third lens elements 3-5, which facilitates manufacture of the imaging lens 2.

$$\frac{T_{L1A1-L3A2}}{L_{BF}} > 1.55 \tag{19}$$

Figure 18:
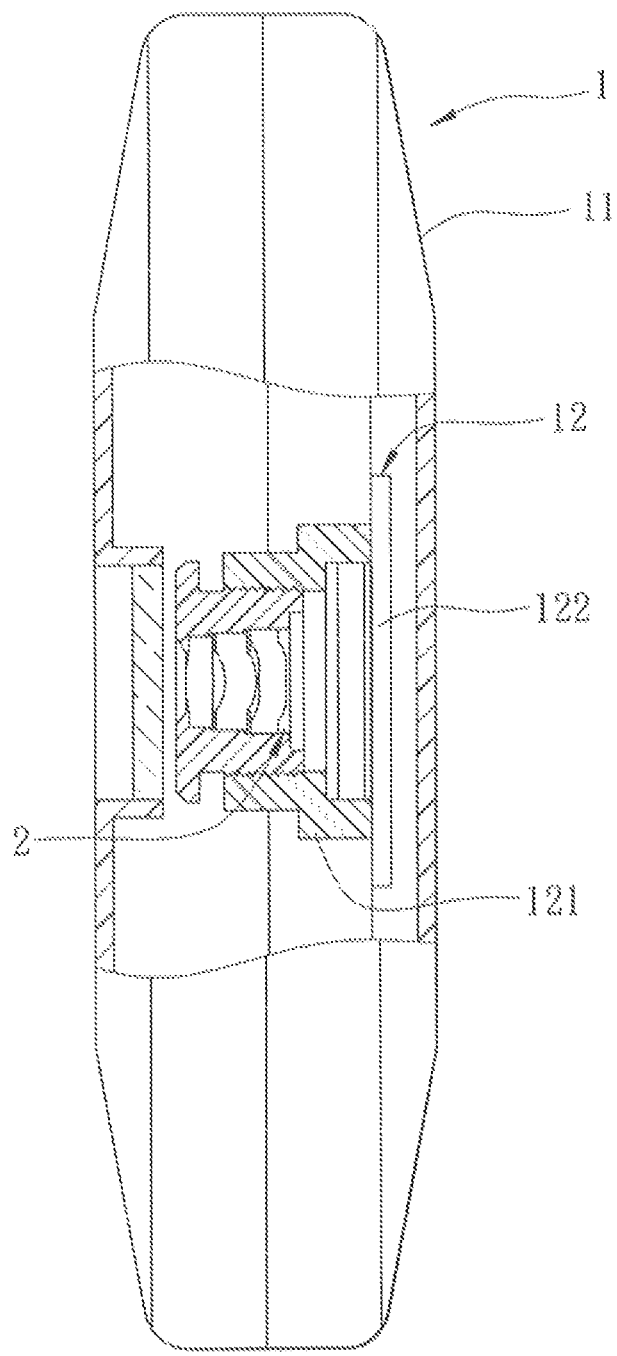
FIG. 18 is a schematic partly sectional view of an electronic apparatus including the imaging lens of the present invention.

Shown in FIG. 18 is an exemplary application of the imaging lens 2, in which the imaging lens 2 is disposed in a housing 11 of an electronic apparatus 1 (such as a mobile phone), and forms a part of an imaging module 12 of the electronic apparatus 1. The imaging module 12 includes a holder 121 on which the imaging lens 2 is disposed, and an image sensor 122 disposed at the image side and operatively associated with the imaging lens 2 for capturing images.

Application and configuration of the imaging lens 2 are not limited to such.

In summary, since the first lens element 3 has a positive refracting power and the object-side surface 31 thereof is a convex surface, the imaging lens 2 has a better light-receiving capability. Moreover, in such a configuration, the second lens element 4 is able to share a portion of the refracting power, which effectively reduces sensitivity of the imaging lens 2 to inaccuracy of the manufacturing process. The symmetrical configuration of the concava object-side surface 41 and the convex image-side surface 42 with respect to the first lens element 3 increases symmetry in structure of the imaging lens 2, which is favorable for correction of chromatic aberration. The design of concavity in the vicinity of the center and convexity in the vicinity of the periphery of the image-side surface 52 of the third lens element 5 is favorable for alleviation of distortion of resultant images at the image plane 10. Moreover, since the imaging lens 2 of each of the preferred embodiments satisfies optical equations 14, 15, and 17 to 19, the imaging lens 2 may be configured to be relatively short in system length (shorter than 3 mm) without significantly compromising optical performance.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising first, second, and third lens elements arranged in order from an object side to an image side, wherein:
    said first lens element has a positive refracting power, and has a convex object-side surface facing toward the object side;
    said second lens element has a concave object-side surface facing toward the object side, and a convex image-side surface facing toward the image side; and
    said third lens element has an image-side surface facing toward the image side, having a concave portion in a vicinity of an optical axis of said imaging lens;
    wherein said third lens element is interposed between said second lens element and an image plane;
    wherein said imaging lens satisfies $|v_1 - v_2| < 5$, and $|v_1 - v_3| > 20$, where $v_1$, $v_2$, and $v_3$ respectively represent dispersion coefficients of said first, second, and third lens elements;
    wherein said imaging lens further satisfies $L_{BF} < 1.072$ mm, where $L_{BF}$ represents a shortest distance between a center point of said image-side surface of said third lens element and said image plane, with said center point of said image-side surface of said third lens element coincides with said optical axis of said imaging lens; and wherein said first lens element further has an image-side surface facing toward the image side; and said imaging lens further satisfies 0.30 mm<$S_{12}$<0.65 mm, where $S_{12}$ represents a distance between a center point of said image-side surface of said first lens element and a center point of said object-side surface of said second lens element, the center point of said image-side surface of said first lens element and the center paint of said object-side surface of said second lens element coincides with the optical axis of said imaging lens.

2. The imaging lens as claimed in claim 1, wherein said second lens element has a positive refracting power.

3. The imaging lens as claimed in claim 1, wherein said imaging lens further satisfies $|v_1-v_2|<3$.

4. The imaging lens claimed in claim 1, wherein said imaging lens further satisfies 0.30 mm <$S_{12}$<0.50 mm.

5. The imaging lens as claimed in claim 1, wherein: said imaging lens further satisfies $$\frac{T_{L1A1-L3A2}}{L_{BF}} > 1.55,$$

where $T_{L1A1-L3A2}$ represents a distance between a center point of said object-side surface of said first lens element and a center point of said image-side surface of said third lens element, with the center point of said object-side surface of said first lens element coincides with the optical axis of said imaging lens.

6. An electronic apparatus comprising:
 a housing; and
 an imaging module disposed in said housing, and including said imaging lens as claimed in claim 1, a holder on which said imaging lens is disposed, and an image sensor disposed at the image side and operatively associated with said imaging lens for capturing images.

\* \* \* \* \*